United States Patent
Boffa et al.

(10) Patent No.: US 10,451,527 B2
(45) Date of Patent: Oct. 22, 2019

(54) METHOD AND APPARATUS FOR CHECKING TYRES, IN A PROCESS AND IN A PLANT FOR MANUFACTURING TYRES FOR VEHICLE WHEELS

(71) Applicant: PIRELLI TYRE S.P.A., Milan (IT)

(72) Inventors: Vincenzo Boffa, Milan (IT); Alessandro Held, Milan (IT); Gianni Mancini, Milan (IT); Albert Berenguer, Milan (IT); Valeriano Ballardini, Imola (IT); Rainer Huber, Neubeuern (DE)

(73) Assignee: PIRELLI TYRE S.P.A., Milan (IT)

( * ) Notice: Subject to any disclaimer, the term of this patent is extended or adjusted under 35 U.S.C. 154(b) by 179 days.

(21) Appl. No.: 15/531,723

(22) PCT Filed: Dec. 1, 2015

(86) PCT No.: PCT/IB2015/059252
§ 371 (c)(1),
(2) Date: May 30, 2017

(87) PCT Pub. No.: WO2016/088040
PCT Pub. Date: Jun. 9, 2016

(65) Prior Publication Data
US 2017/0370807 A1    Dec. 28, 2017

(30) Foreign Application Priority Data
Dec. 5, 2014   (IT) ............... MI2014A2095

(51) Int. Cl.
*G01M 17/02*   (2006.01)
*B29D 30/00*   (2006.01)

(52) U.S. Cl.
CPC ........ *G01M 17/021* (2013.01); *G01M 17/022* (2013.01); *G01M 17/027* (2013.01);
(Continued)

(58) Field of Classification Search
None
See application file for complete search history.

(56) References Cited

U.S. PATENT DOCUMENTS

| 7,568,385 B2 * | 8/2009 | Maehner | G01B 11/161 |
|---|---|---|---|
| | | | 73/146 |
| 8,813,550 B2 * | 8/2014 | Lindsay | G01M 17/027 |
| | | | 73/146 |

(Continued)

FOREIGN PATENT DOCUMENTS

| DE | 102007009040 B3 | 5/2008 |
|---|---|---|
| DE | 102008037356 A1 | 3/2010 |

(Continued)

OTHER PUBLICATIONS

International Preliminary Report on Patentability for International Application No. PCT/IB2015/059252 filed Dec. 1, 2015 on behalf of Pirelli Tyre S.P.A., dated Jun. 6, 2017. 14 pages.
(Continued)

*Primary Examiner* — Peter J Macchiarolo
*Assistant Examiner* — Jermaine L Jenkins
(74) *Attorney, Agent, or Firm* — Steinfl + Bruno LLP

(57) ABSTRACT

An apparatus and a method for checking tires is described. The apparatus has a first check unit having an inlet for tires and a plurality of check tools. The apparatus has a second check unit having an outlet for the tires and a plurality of check tools. The apparatus has an overturning and transport device operatively interposed between the first check unit and the second check unit. The first check unit, the second check unit and the overturning and transport device define a check path configured to be traversed by each tire step by step. The first check unit and the second check unit have the same check tools configured for executing the same checks on respective axial halves of the tires.

47 Claims, 6 Drawing Sheets

(52) U.S. Cl.
CPC .............. *B29D 2030/0027* (2013.01); *B29D 2030/0066* (2013.01)

(56) References Cited

U.S. PATENT DOCUMENTS

| | | | |
|---|---|---|---|
| 9,145,260 B2* | 9/2015 | Miyazaki | B29D 30/0016 |
| 9,288,447 B2* | 3/2016 | Leobal | G01M 17/021 |
| 10,121,238 B2* | 11/2018 | Krolczyk | G01N 21/952 |
| 2005/0058333 A1* | 3/2005 | Kaneko | G01B 11/24 |
| | | | 382/141 |
| 2005/0229702 A1* | 10/2005 | Haydu | B60C 25/00 |
| | | | 301/5.21 |
| 2012/0134656 A1 | 5/2012 | Mizukusa et al. | |

FOREIGN PATENT DOCUMENTS

| | | |
|---|---|---|
| EP | 0915328 A2 | 12/1999 |
| EP | 1061332 A2 | 12/2000 |
| EP | 1436789 A1 | 7/2004 |
| EP | 1626271 A1 | 2/2006 |
| WO | 03/042935 A1 | 5/2003 |
| WO | 2014049547 A1 | 4/2014 |

OTHER PUBLICATIONS

PCT International Search Report and Written Opinion for PCT/IB2015/059252 filed on Dec. 1, 2015 in the name of Pirelli Tyre S.P.A., dated Oct. 6, 2016.

Chinese Office Action for Chinese Application No. 201580073008.3 on behalf of Pirelli Tyre S.P.A. dated Jan. 22, 2017. 2 pages. (English translation of Summary).

* cited by examiner

METHOD AND APPARATUS FOR CHECKING TYRES, IN A PROCESS AND IN A PLANT FOR MANUFACTURING TYRES FOR VEHICLE WHEELS

CROSS REFERENCE TO RELATED APPLICATIONS

The present application is the U.S. national stage of International Patent Application PCT/162015/059252 filed internationally on Dec. 1, 2015, which, in turn, claims priority to Italian Patent Application No. MI2014A002095 filed on Dec. 5, 2014.

FIELD OF THE INVENTION

The object of the present invention is a method and an apparatus for checking tyres, in a process and in a plant for manufacturing tyres for vehicle wheels.

In particular, the present invention is situated in the field of quality checks executed on tyres, preferably moulded and vulcanised, adapted to verify the compliance of the same with the design specifications and allow sending those in compliance to storage, discarding those defective.

A tyre for vehicle wheels generally comprises a carcass structure comprising at least one carcass ply having axially opposite end flaps engaged with respective anchoring annular structures integrated in the zones normally identified with the name "beads". The carcass structure is associated with a belt structure comprising one or more belt layers, situated in radial superimposition with respect to each other and with respect to the carcass ply. In radially outer position with respect to the belt structure, a tread band made of elastomeric material is applied, like other constituent semi-finished products of the tyre. Respective sidewalls made of elastomeric material are also applied in axially outer position on the lateral surfaces of the carcass structure, each extended from one of the lateral edges of the tread band up to the respective anchoring annular structure to the beads.

Following the building of the green tyre actuated by means of assembly of respective semi-finished products, the production cycle terminates by executing a moulding and vulcanisation treatment aimed to determine the structural stabilisation of the tyre by means of crosslinking of the elastomeric material as well as imparting on the tread band a desired tread design and at the sidewalls possible distinctive graphic marks.

With the term "elastomeric material", it is intended a composition comprising at least one elastomeric polymer and at least one reinforcement filler. Preferably, such composition also comprises additives such as crosslinking agents and/or plasticisation agents. Due to the presence of the crosslinking agents, such material can be crosslinked by means of heating, so as to form the final manufactured product.

With the term "checking" referred to the tyres, it is generically intended all those non-destructive operations that allow detecting possible external defects (on the radially outer and/or radially inner surfaces) and/or internal defects (in the structure) of the tyre. Said checks can for example be of optical type (photography, shearography, holography, radiography, etc.), ultrasonic type or mechanical type, or a combination of these.

With the terms "lower", "upper", "bottom", "top", "below" and "above" the relative position of an element is identified with respect to the ground—such element being a component of a tyre, a tyre, an apparatus, a device, etc.—or the relative position of one of said elements is identified with respect to another element.

With the term "halves of the tyre" it is intended the axial halves of the tyre, i.e. the halves delimited by an axial symmetry/centreline plane orthogonal to the main rotation axis of the tyre and equidistant from the beads of the tyre itself.

With "at least one half of the tyre" it is intended a complete half as defined above plus, possibly, a further portion of the other half that is axially extended from the aforesaid symmetry/centreline plane.

With "simultaneous and step by step advancing of the tyres" it is intended the simultaneous movement of a plurality of tyres placed along a path of a fixed step, at substantially constant time intervals.

With "building/production cycle time" it is intended the time that elapses between the exit of one built/finished tyre from the building/production line, and the exit of the subsequent tyre.

With "check cycle time" it is intended the time that elapses between the exit of one tyre checked by the check apparatus and the exit of the subsequent tyre.

Preferably after vulcanisation, the tyres are subjected to quality checks in order to verify the possible presence of defects.

BACKGROUND OF THE INVENTION

The document DE 10 2008 037 356 illustrates a system for testing tyres for the purpose of quality check and for reducing the risks tied to safety. Such tests allow the recognition of defective points. The system comprises a reader device for reading an identifier adapted to identify the tyre, a transport system provided with a plurality of transport sections for conveying the tyres along a transport direction, at least one test device and at least one check device adapted to check the reader device, the transport system and the test device. The transport system is provided with a plurality of sensors which detect the presence of a tyre in the transport sections. The check device is configured for recording the position of the tyre in the transport sections and for keeping track of the movement of the tyre itself. In one embodiment of such document, two test devices are illustrated, arranged in sequence and intended to test the tyres by means of different measurement methods.

The document EP 1 436 789 illustrates a method and a device for inspecting a tyre. The tyre to be inspected is first associated with a rim formed by two portions and inflated in an assembly station, then brought in sequence into multiple inspection stations where the tyre is made to rotate together with the rim while the inspection operations are executed, and then the tyre is brought into a disassembly station where the tyre is deflated and the portions of the rim are removed therefrom.

The document US 2012/0134656 illustrates an illumination device and an inspection device for a tyre which are capable of detecting irregularities in the shape of the tyre itself. A photographic device photographs the inner surface of the tyre while a guide device makes the tyre and the inspection device rotate with respect to each other around an axis of the tyre. Meanwhile, a light unit arranged along the peripheral inner surface of the tyre emits light in a circumferential direction of the tyre itself. One embodiment of such document illustrates three successive, side-by-side inspection portions into which a tyre is brought in sequence by means of transport portions. The tyre lying in the first inspection portion is moved onto the rotary table of the second inspection portion, the tyre lying in the second inspection portion is moved onto the rotary table of the third inspection portion and the tyre lying in the third inspection portion is moved onto an outlet table.

In the context of automated systems for the inspection of the tyres that exit from the production line, like those described above, the Applicant has observed that the time actually necessary for a complete and careful check of each single tyre is not technically compatible with the high productivity of the current production lines (building and vulcanisation). In current plants, this signifies checking all the tyres produced but foregoing part of the numerous checks or, alternatively, executing careful checks only on some tyres (random checks).

In particular, the Applicant has observed that the known systems are not able to execute a careful check of all the tyres in the times set by the building/production line, i.e. executing such checks in line without the tyres to be checked being accumulated.

The Applicant has also verified that the known automated systems are in some cases very bulky (see for example the document DE 10 2008 037 356), in other cases structurally complex and hence costly and not very reliable (like those described in documents US 2012/0134656 and EP 1 436 789).

SUMMARY

In such context, the Applicant has set the objective of checking all the tyres exiting from the building/production line by optimising the check times, in particular by executing all the checks with times and modes compatible with the building/production cycle time set by the same line, intended as the time that elapses between the exit of one tyre from the building/production line and the exit of the subsequent tyre.

The Applicant has observed that it would be extremely advantageous to execute such check so as to be able to retroactively work on the building/production line and adjust the process parameters so that a possible defect can be eliminated or so that an irregularity which is not an actual defect on the checked tyres can be eliminated and not give rise to actual defects on subsequent tyres, all of the above in a repeatable, reliable and accurate manner.

The Applicant has also verified the need to execute such check on tyre models that are even quite different from each other with regard to size (fitting, sidewall height, tread width, etc.) and type (car, motorcycle, truck, winter, summer, self-sealing, run-flat, etc.), at the same time limiting the size, complexity and costs of the apparatus dedicated thereto.

The Applicant has therefore perceived that by obtaining a check path that can be traversed step by step by each tyre to be checked, and by subjecting each tyre to a plurality of pre-established checks, it was possible to meet the needs set forth above, especially with regard to the compatibility with the building/production cycle time, to the repeatability and reliability of the results and to the flexibility of the entire check system in accordance with each tyre model.

More precisely, the Applicant has found that the above-mentioned requirements can be met by executing multiple checks, first on one axial half of each tyre and then on the other axial half while the tyres advance simultaneously and step by step along a check path. Such checks are executed between one advancing step and the next while each tyre rotates on itself around the rotation axis thereof and check tools are placed in fixed positions with respect to such rotation axis.

More specifically, according to one aspect, the present invention relates to a method for checking tyres, each tyre having a main rotation axis and an axial centreline plane.

Preferably provision is made for simultaneously advancing tyres step by step along a check path and checking said tyres during time intervals placed between subsequent steps.

Preferably, for each of the tyres, provision is made for checking at least one first half of the tyre by executing a plurality of checks along a first part of the check path, wherein the first half is an axial half of the tyre delimited by said axial centreline plane.

Preferably, for each of the tyres, provision is made for overturning said tyre around an overturning axis after the exit from said first part of the check path.

Preferably, for each of the tyres, provision is made for conducting said tyre to the inlet of a second part of the check path.

Preferably, for each of the tyres, provision is made for checking at least one second half of said tyre by executing the same plurality of checks along said second part of the check path, wherein the second half is the other axial half of the tyre delimited by said axial centreline plane.

In accordance with a different aspect, the present invention relates to an apparatus for checking tyres, each tyre having a main rotation axis and an axial centreline plane.

Preferably provision is made for a first check unit having an inlet for tyres and comprising a plurality of check tools.

Preferably provision is made for a second check unit having an outlet for the tyres and comprising a plurality of check tools.

Preferably provision is made for an overturning and transport device operatively interposed between the first check unit and the second check unit.

Preferably, the first check unit, the second check unit and the overturning and transport device define a check path configured in a manner so as to be traversed by each tyre step by step.

Preferably, the first check unit and the second check unit comprise the same check tools configured for executing the same checks on at least respective axial halves of the tyres.

Preferably, said overturning and transport device is configured for overturning the tyre around an overturning axis.

In accordance with a further aspect, the present invention relates to a process for producing tyres for vehicle wheels, comprising the method for checking tyres described and claimed in accordance with the present invention.

Preferably, the process comprises: building green tyres by means of assembly of respective components, preferably on at least one drum; moulding and vulcanising the tyres; wherein the method for checking tyres is actuated after the moulding vulcanisation.

In accordance with a further aspect, the present invention relates to a plant for producing tyres for vehicle wheels, comprising the apparatus for checking tyres described and claimed in accordance with the present invention.

Preferably, the plant comprises a production line comprising an apparatus for building green tyres and at least one vulcanisation unit operatively arranged downstream of the building apparatus, wherein the apparatus for checking tyres is operatively situated downstream of the vulcanisation unit.

Preferably, the green tyre building apparatus comprises:
a building line at which one or more building drums, preferably toroidal, are moved between different work stations arranged to form, on each building drum, a component of the tyre being processed.

Preferably, the green tyre building apparatus comprises:

a carcass building line at which one or more building drums are moved between different work stations arranged to form a carcass sleeve on each building drum;

an outer sleeve building line at which one or more forming drums are moved between different work stations arranged to form an outer sleeve on each forming drum;

an assembly station at which the outer sleeve is coupled to the carcass sleeve.

The Applicant deems that the organisation of the check apparatus and the implementation of the method according to the invention allow optimising the check times and limiting the dedicated check zone spaces, with considerable savings in terms of cost per produced tyre.

The Applicant in particular deems that the invention allows carrying out all the necessary checks with times and modes compatible with the building/production cycle time set by the building/production line placed upstream. In particular, the time that elapses between the entrance (exit) of one tyre into the check path and the entrance (exit) of a subsequent tyre can be set equal to the building/production cycle time. In other words, the check cycle time can be equal to the building/production cycle time.

The Applicant deems that the invention allows:

grouping the necessary checks in different check stations/time intervals;

executing multiple check cycles in one of the check stations or time intervals;

executing, in parallel, the checks on multiple tyres placed in different check stations;

simultaneously executing multiple checks on a tyre during a check cycle.

The Applicant also deems that the invention allows checking the tyres with accuracy and simplicity, since the tools can work and execute the same checks first on one axial half of each of said tyres and then on the other half. The Applicant also deems that the invention allows implementing checks with high capacity for identifying defects and high reliability, without negatively affecting the check times and the dedicated check spaces. These aspects have positive effects on the quality of the produced tyres, which are declared compliant.

The Applicant finally deems that the invention ensures high flexibility and allows—with relative simplicity and rapidity—changing the type of executed checks, adding and/or removing checks, varying their time and/or spatial sequence, and more generally adjusting all the functioning parameters of the apparatus. It follows that the invention allows checking models of tyres that are even quite different from each other in terms of size and/or shape, and allows quickly passing from one type to the other, also for the purpose of being able to check tyre models that will be developed in the future.

The present invention, in at least one of the aforesaid aspects, can have one or more of the preferred characteristics that are described hereinbelow.

Preferably, said overturning axis is perpendicular to said main axis and belongs to said axial centreline plane.

In one embodiment, said first part of the check path coincides with said second part of the check path. In other words, each tyre traverses the same part of the path twice.

In a different embodiment, said first part of the check path is separate from said second part of the check path. In other words, each tyre traverses the first and second part of the path only once and in succession.

Preferably, the number of time intervals along the first part of the check path is equal to the number of time intervals along the second part of the check path. Each axial half of each tyre is therefore subjected to the checks subdivided in the same number of time intervals.

Preferably, the number of overall time intervals is comprised between two and ten, preferably comprised between four and eight, more preferably equal to six. The number of time intervals during which each axial half of each tyre is subjected to the checks is therefore comprised between one and five, preferably between two and four, more preferably equal to three.

Preferably, the sequence of the checks along the first part of the check path is equal to the sequence of the checks along the second part of the check path. The two sequences are identical and consecutive and hence can be implemented by means of hardware (check tools, actuation systems, etc.) and software that are entirely identical, with savings in terms of costs and installation/management/maintenance times.

Preferably, the number of checks of said plurality of checks is comprised between twenty and forty, preferably equal to about thirty. Each half-part is subjected to the same number of checks of said plurality.

Preferably, during each of said time intervals, the tyres are subjected to at least one check cycle, preferably to a plurality of successive check cycles, preferably to a number of check cycles comprised between two and eight, more preferably a four check cycles. In a single time interval, the check cycles are executed in sequence one after the other and in some cases also in parallel. The same number of check cycles can be executed in each time interval, or a different number of check cycles can be executed in different time intervals.

Preferably, during each of said check cycles, the tyres are made to rotate around respective main axes. The main rotation axis of the tyre remains fixed while the tyre rotates thereon. The circular symmetry of the tyre is exploited in order to limit the number and complexity of the check tools to the minimum.

Preferably, during each of said check cycles, check tools are arranged in pre-established check positions while the respective tyres rotate around respective main axes.

Preferably, said check positions are pre-established as a function of the type of tyre to be checked. The tools are preferably moved in the space only to bring them into the abovementioned check positions. Each tool preferably acts in each instant on a limited circumferential portion of the tyre. During the check, the tool is not moved, but rather it is the tyre that runs in front of/below said tool. The zone checked during a complete revolution of the tyre is therefore an annular portion of said tyre. This selection considerably simplifies the management of the movement of the tools and the management of the apparatus in its entirety.

Preferably, between one check cycle and the next, check tools are moved into different check positions. If necessary, the same check tools are employed for checking different zones of the same tyre during different cycles. The same tool can, for example, be arranged in different axial or radial positions with respect to the tyre, within the tyre or outside the tyre.

Preferably, during each of said check cycles, the tyres are made to rotate a rotation angle around respective main axes of at least 360°, preferably greater than 360°, more preferably comprised between about 360° and about 400°, still more preferably comprised between about 365° and about 375°. In other words, each point of the abovementioned annular portion passes below/in front of the tool at least once during a cycle. Preferably, each point of the abovementioned annular portion passes below/in front of the tool only once during a cycle, except in a zone of overlap (of about 5°÷15°) in which the tool acts twice. In this manner, one is assured that the entire annular portion is effectively checked.

Preferably, during each of said check cycles, the tyres are made to rotate with a peripheral speed that is predefined and independent of the size of the tyres to be checked. Preferably, said peripheral speed is constant.

Preferably, during each of said check cycles, a plurality of checks is executed on each said at least one half of each tyre. During the rotation of the tyre, it is possible to simultaneously execute multiple checks, preferably by simultaneously using multiple check tools.

Preferably, said plurality of checks is comprised between two and six, more preferably equal to three. Given the same total checks to be executed, the simultaneous combination of multiple checks allows reducing the number of cycles and/or the number of time intervals.

Preferably, a check cycle time between the exit/entrance of one tyre from the/into the check path and the exit/entrance of a subsequent tyre is comprised between about 20 s and about 60 s, preferably between about 25 s and about 35 s, more preferably equal to about 30 s. Such values are compatible with the cycle times of the building/production line placed upstream.

In one embodiment, the first check unit and the second check unit coincide and the overturning and transport device is configured for overturning the tyre coming from the outlet of said check unit and for transferring it to the inlet of the same check unit. In other words, there is usually only one check unit and each tyre completes two passages through said single check unit, first abutted against one sidewall and then against the other.

Preferably, the apparatus comprises auxiliary transport devices operatively interposed between the outlet of said single check station and the inlet thereof.

In a different embodiment, the first check unit and the second check unit are separate and placed in succession in the space and the overturning and transport device is configured for overturning the tyre coming from the first check unit and for transferring it to the second check unit. In other words, each tyre transits only once through each check unit placed in sequence.

Preferably, the first check unit and the second check unit each comprise at least one check station, preferably a plurality of check stations, preferably a number of check stations comprised between two and four, more preferably three check stations. Each check station corresponds with a time interval in which at least the half of each tyre is subjected to check.

Preferably, the first check unit and the second check unit comprise the same number of check stations. The apparatus in its entirety comprises at least two check stations, preferably a number of check stations comprised between four and eight, more preferably six check stations.

Preferably, the first check unit and the second check unit are substantially identical. The apparatus is therefore formed by two check units with the same structure, placed one after the other and separate from the overturning and transport device. This characteristic allows limiting the apparatus design, manufacturing and maintenance costs.

Preferably, the first check unit, the overturning and transport device and the second check unit are mutually aligned along a substantially rectilinear path. This configuration allows for easy placement in the areas intended to house the building/production lines and in addition it simplifies the transport of the tyres from the first check unit to the second check unit.

Preferably, the first check unit and the second check unit are mutually superimposed and the overturning and transport device is placed at the outlet of said first check unit and at the inlet of said second check unit. The overturning and transport device is preferably configured for lifting or lowering the tyres in order to bring them from the first to the second check unit. Such configuration is compact in plan view and allows the installation in relatively tight spaces.

Preferably, each check station comprises: a support for a tyre to be checked, at least one of the check tools and transfer devices for transferring the tyre from said check station to a subsequent check station of the same check unit or to the overturning and transport device. Each station integrates all the elements necessary for operating on the tyres without requiring the intervention of other external devices.

Preferably, the support has at least one substantially horizontal abutment zone that is configured for receiving and supporting a sidewall of the tyre. The abutment against the sidewall ensures that the shape of the tyre is always the same during all the tests, without having to inflate it. The tyre at rest (deflated) reduces the vibrations thereof with respect to an inflated tyre, and improves the quality of the checks, in particular of the obtained images. The abutment against the sidewall prevents considerable mechanical stresses, which could compromise the integrity thereof and the quality of the images. The abutment against the sidewall also allows an easy centring with respect to the reference system of the checks.

Preferably, the support is a table rotating around a respective vertical rotation axis. The rotary table, in addition to rotating the tyre, ensures a stable support.

Preferably, the transfer devices comprise at least one movable transport surface, preferably at least one conveyor belt, associated with the support. The support in rotary table form therefore carries out four functions, with a simple and inexpensive structure: stable support of the tyre during the checks and the transport, centring of the tyre, rotation during the checks and translation for the transport towards the subsequent station.

Preferably, each check station comprises a framework provided with a lower portion carrying the support and with an upper portion carrying devices for supporting and moving the tools. Said supporting and moving devices are placed and moved above the tyres without the risk of interference with the tyres themselves.

Preferably, each check station comprises a plurality of check tools, preferably a number of check tools comprised between two and eight, preferably between four and six, more preferably equal to three. Multiple checks can therefore be simultaneously executed in a check cycle.

Preferably, the supporting and moving devices comprise at least one anthropomorphic robotic arm, preferably a plurality of anthropomorphic robotic arms, more preferably two anthropomorphic robotic arms, constrained to the upper portion of the framework. The anthropomorphic robotic arms ensure high flexibility since, due to their numerous degrees of freedom and by means of their programming, it is possible to easily change the positions of the tools during the checks, the sequence of the checks, etc.

Preferably, each anthropomorphic robotic arm carries at least one check tool, preferably at least two check tools.

Integrating multiple check tools on a single arm allows reducing the number of arms and the complexity/cost of the apparatus.

Preferably, during the advancing and the check, the tyres lie abutted against a sidewall.

Preferably, during each of said steps, the tyres are translated along said check path. The simple translation allows limiting the duration of the steps. In addition, the translation times and speeds from one check station to the next remain the same, since the main axes of the tyres are substantially always in the same positions independent of their size/type.

Preferably, during the overturning, the tyre is rotated around an overturning axis perpendicular to its rotation axis. Preferably, the overturning axis is horizontal.

Preferably, the overturning axis intersects the rotation axis. In this manner, the inertia is minimised during the overturning.

Preferably, the duration of each time interval is comprised between about 20 s and about 60 s, preferably between about 25 s and about 40 s, more preferably it is equal to about 30 s. Preferably, all the time intervals have the same duration. Such same duration is substantially equal to the time between the entrance (exit) of one tyre into the check path/check apparatus and the entrance (exit) of a subsequent tyre. Such same duration is compatible with the building/production cycle time of the building/production line placed upstream.

Preferably, the duration of each check cycle is comprised between about 2 s and about 8 s, preferably between about 4 s and about 6 s, more preferably it is equal to about 5 s. In each check interval, multiple successive check cycles are therefore included.

Preferably, said predefined peripheral speed is comprised between about 0.1 m/s and about 1.0 m/s, more preferably between about 0.2 m/s and about 0.8 m/s. Such peripheral speed allows limiting the duration of the check cycles and simultaneously allows working with complete safety and precision.

Preferably, during each of said check cycles, the tyres are made to rotate with an angular speed dependent on the size of the tyres to be checked.

Preferably, said angular speed is comprised between about 0.63 rad/s (360°/10 s) and about 3.14 rad/s (360°/2 s), more preferably between about 0.79 rad/s (360°/8 s) and about 2.09 rad/s (360°/3 s).

Preferably, during said time intervals, the tyres are also centred with respect to a reference system.

Preferably, the centring lasts a time comprised between about 0.5 s and about 5 s, preferably equal to about 2 s.

Preferably, the duration of each of said steps is comprised between about 3 s and about 7 s, preferably equal to about 5 s.

Preferably, the first check unit and the second check unit together delimit an angle equal to 180°, alternatively equal to about 90°. The first and the second unit can be arranged angled, in order to adapt the apparatus to the spaces where it is situated.

Preferably, each check station comprises devices for supporting and moving the tools arranged above the support.

Preferably, each anthropomorphic robotic arm has at least five rotation axes, preferably six axes, more preferably seven axes. The number of degrees of freedom of the anthropomorphic robotic arms allows positioning the check tools in any position with respect to the tyre to be checked.

Preferably, the check tools are carried at terminal ends of the anthropomorphic robotic arms.

Preferably, during the check cycles the tools are positioned in radially outer positions with respect to the tyre.

Preferably, during the check cycles the tools are positioned in radially inner positions with respect to the tyre.

Preferably, during the check cycles the tools are positioned above the tyre.

Preferably, the check tools are integrally mounted on the respective anthropomorphic robotic arms during the operation of the check apparatus and/or the actuation of the method according to the invention. In other words, there is no need to change the tools, placing some and removing others, during a check session (corresponding to a building/production session). Such substitution may possibly be provided between one session and the next in order to carry out apparatus maintenance/repair and/or upgrade operations.

Preferably, the overturning and transport device comprises a pair of parallel and spaced supports that are rotatable around a respective overturning pin, preferably horizontal. The structure of the overturning device is simple, reliable and inexpensive.

Preferably, at least one of the supports of the overturning and transport device comprises at least one movable transport surface, preferably at least one conveyor belt.

Preferably, the frameworks, the supports and the anthropomorphic robotic arms are substantially identical for all the check stations.

Preferably, the check stations of each of the check units are identical to each other, apart from, possibly, the managed check tools.

Preferably, said checks are of optical type (e.g. photography, shearography, holography, radiography, etc.), ultrasonic type, mechanical type or a combination thereof.

Preferably, said checks are executed on the outer surfaces of the tyre (e.g. tread, shoulders, sidewalls, beads) and/or on the inner surfaces of the tyre (e.g. on the impermeable elastomeric material layer or liner) and/or within the tyre.

Preferably the check tools comprise: cameras, light sources (laser lights, LED, etc.), mirrors, pressure elements (wheels, cylinders), radiographic apparatuses.

The check apparatus and method according to the invention ensure high flexibility since they allow, for example, adding or removing check stations/time intervals, changing the number of check cycles within one or more of the time intervals, varying the sequence of the check cycles, adding or removing anthropomorphic robotic arms in one or more check stations, changing the check tools for example with other better-performing check tools.

DESCRIPTION OF DRAWINGS

Further characteristics and advantages will be clearer from the detailed description of a preferred but not exclusive embodiment of a method and an apparatus for checking tyres in a process and a plant for manufacturing tyres for vehicle wheels in accordance with the present invention.

Such description will be set forth hereinbelow with reference to the set of drawings, provided only as a non-limiting example, in which.

DETAILED DESCRIPTION

Figure 1:
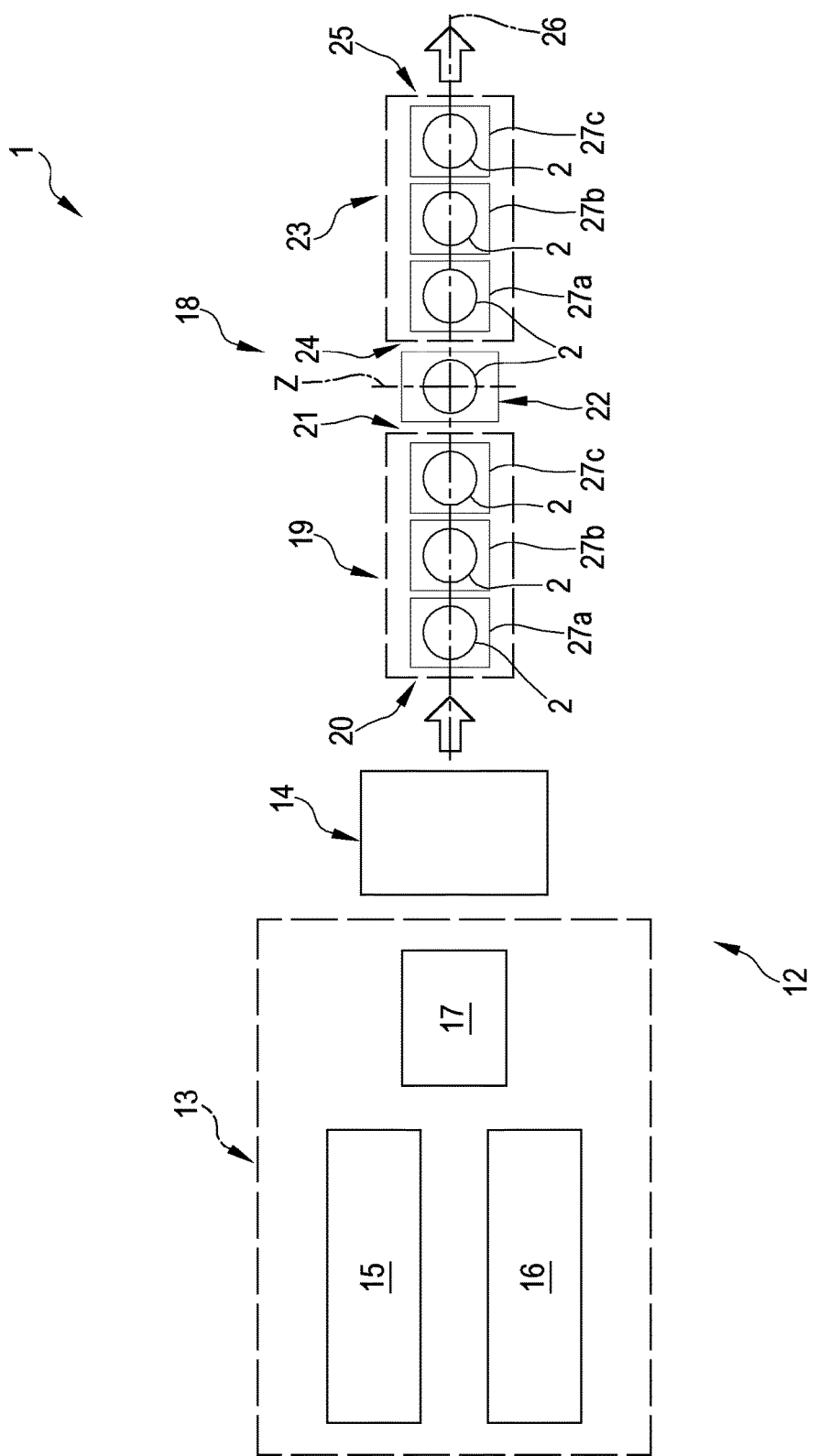
FIG. 1 schematically shows a plant for manufacturing tyres for vehicle wheels.

With reference to FIG. 1, reference number 1 overall indicates a plant for manufacturing tyres for vehicle wheels.

Figure 7:
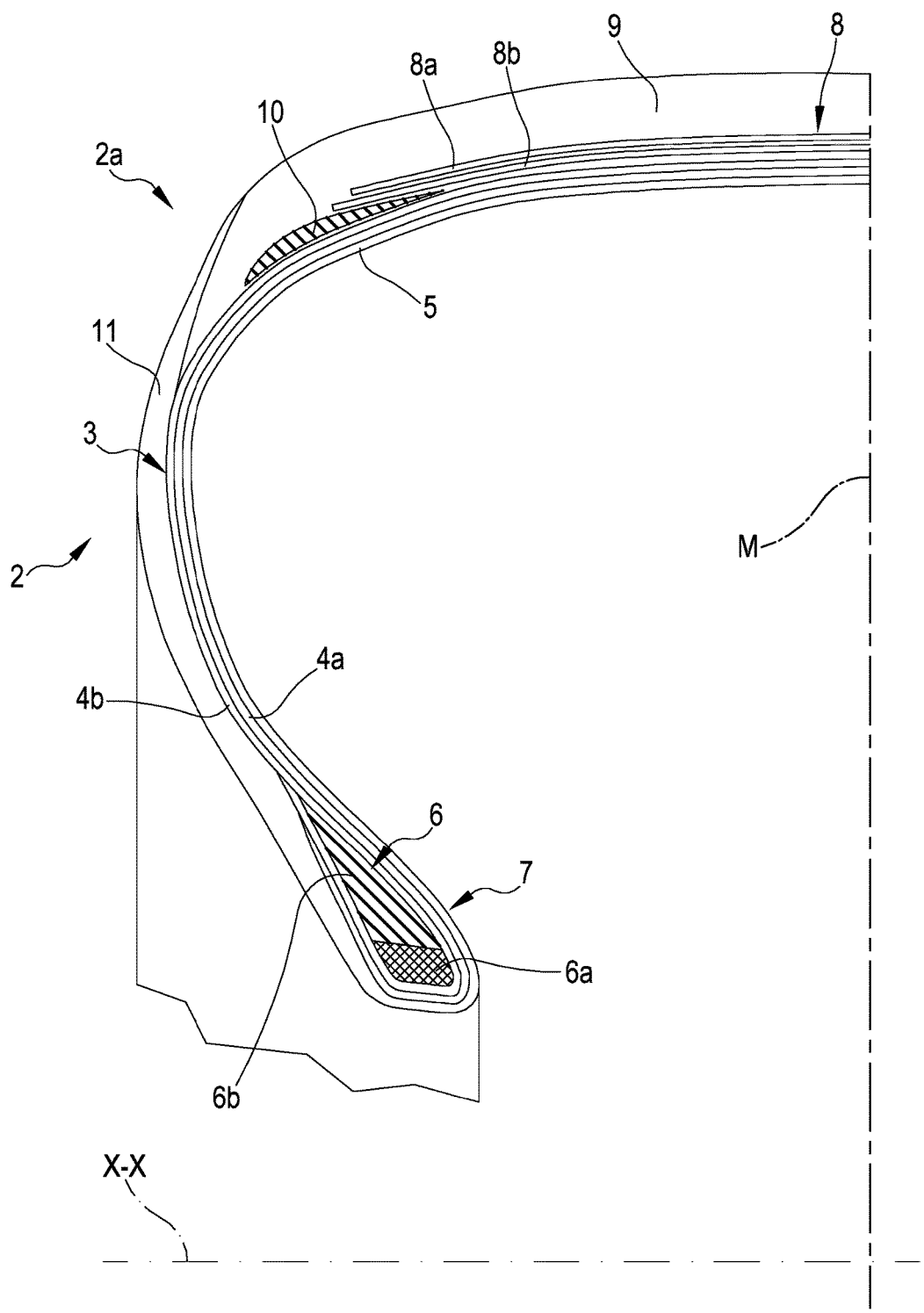
FIG. 7 shows a radial half-section of a tyre built with the plant of FIG. 1.

A tyre 2, made in said plant, is illustrated in FIG. 7 and essentially comprises a carcass structure 3 having two carcass plies 4a, 4b. A layer of impermeable elastomeric material or so-called liner 5 is applied within the carcass ply/plies 4a, 4b. Two anchoring annular structures 6, each comprising a so-called bead core 6a carrying an elastomeric filler 6b in radially outer position, are engaged with respective end flaps of the carcass plies 4a, 4b. The anchoring annular structures 6 are integrated in proximity to zones normally identified with the name "beads" 7, at which the engagement usually occurs between the tyre 2 and a respective mounting rim. A belt structure 8 comprising belt layers 8a, 8b is circumferentially applied around the carcass plies 4a, 4b, and a tread band 9 is circumferentially superimposed on the belt structure 8. The belt structure 8 can be associated with so-called "under-belt inserts" 10, each placed between the carcass plies 4a, 4b and one of the axially opposite terminal edges of the belt structure 8. Two sidewalls 11, each extended from the corresponding bead 7 to a corresponding lateral edge of the tread band 9, are applied in laterally opposite positions on the carcass plies 4a, 4b. The portion of each sidewall 11 close to the lateral edge of the tread band 9 is known as the shoulder of the tyre.

The tyre 2 has a centreline plane "M" (FIG. 7) equidistant from the respective beads 7 and perpendicular to its main rotation axis "X-X", when the tyre is in service. The centreline plane "M" subdivides the tyre 2 into a first axial half 2a and a second axial half 2b that substantially mirror each other (except for the tread design, which may be not symmetric with respect to the aforesaid centreline axis "M").

The plant 1 illustrated in FIG. 1 comprises a tyre 2 production line 12 formed by a green tyre building apparatus 13 and at least one moulding and vulcanisation unit 14 operatively arranged downstream of the building apparatus 13.

In the non-limiting embodiment of the plant 1 illustrated in FIG. 1, the building apparatus 13 comprises a carcass building line 15, at which forming drums, not illustrated, are moved between different stations for supplying semi-finished products arranged to form, on each forming drum, a carcass sleeve comprising the carcass plies 4a, 4b, the liner 5, the anchoring annular structures and possibly at least one part of the sidewalls 11.

Simultaneously, in an outer sleeve building line 16, one or more auxiliary drums, not illustrated, are sequentially moved between different work stations arranged to form, on each auxiliary drum, an outer sleeve comprising at least the belt structure 8, the tread band 9, and possibly at least one part of the sidewalls 11.

The building apparatus 13 also comprises an assembly station 17, at which the outer sleeve is coupled to the carcass sleeve.

In other embodiments of the plant 1, not illustrated, the building apparatus 13 may be of different type, for example arranged to form all the aforesaid components on a single drum.

The built tyres 2 are finally transferred to the moulding and vulcanisation unit 14. From the production line 12, in particular, from the moulding and vulcanisation unit 14, the finished tyres 2 sequentially exit, one after the other, with a predefined frequency and a corresponding predefined production cycle time "Tcp". Such cycle time "Tcp" may for example be about 27 s.

Preferably downstream of the production line 12, the plant 1 comprises an apparatus 18 for checking tyres configured for executing the check of said tyres 2 after the moulding and vulcanisation.

The plant 1 may comprise, in combination or as an alternative, the same apparatus 18 for checking tyres, configured for executing the check of said tyres 2 at the end of the building and before the moulding and vulcanisation step.

Figure 2:
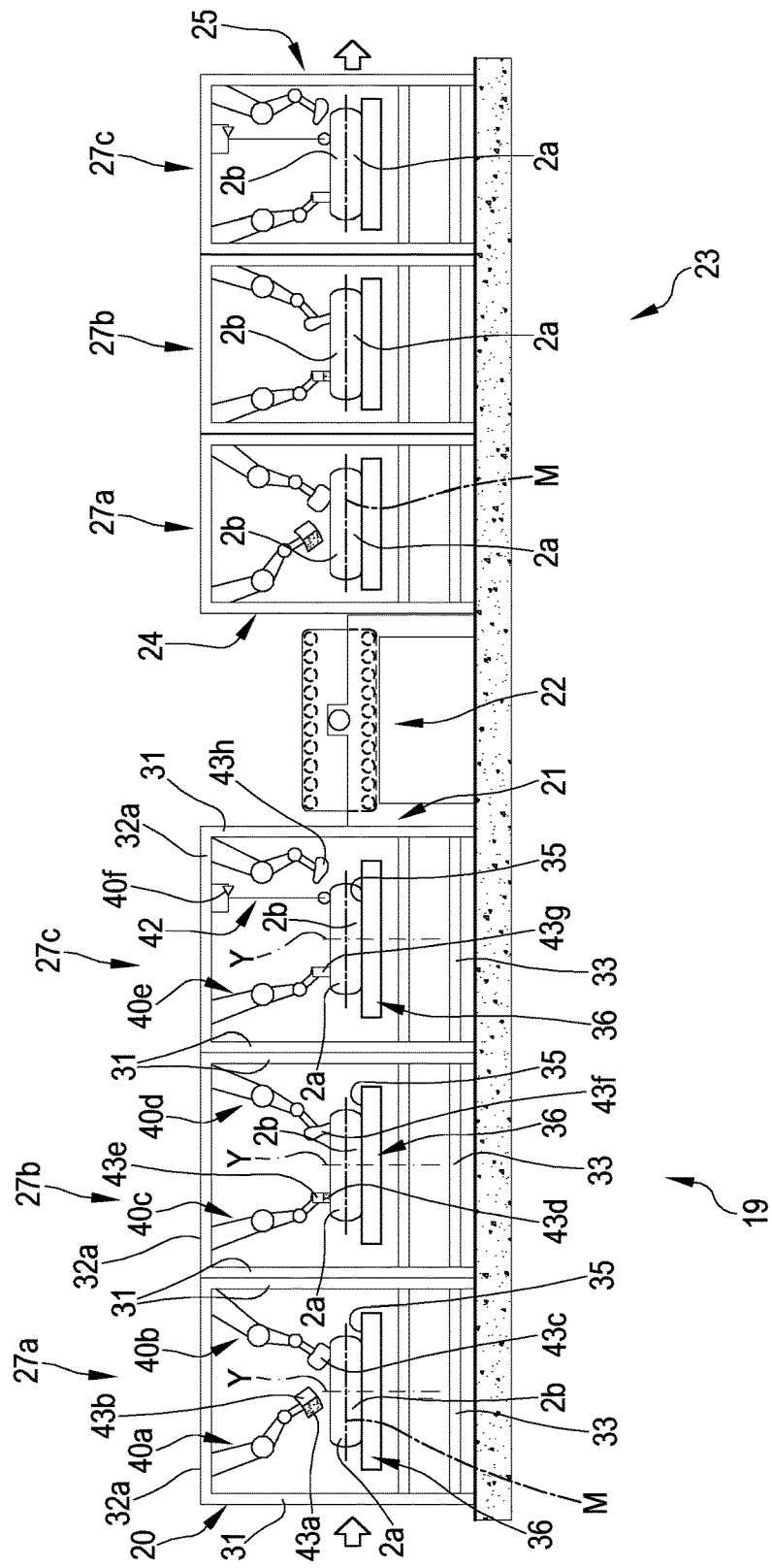
FIG. 2 illustrates an enlarged elevation view of an apparatus for checking tyres belonging to the plant of FIG. 1.
Figure 3:
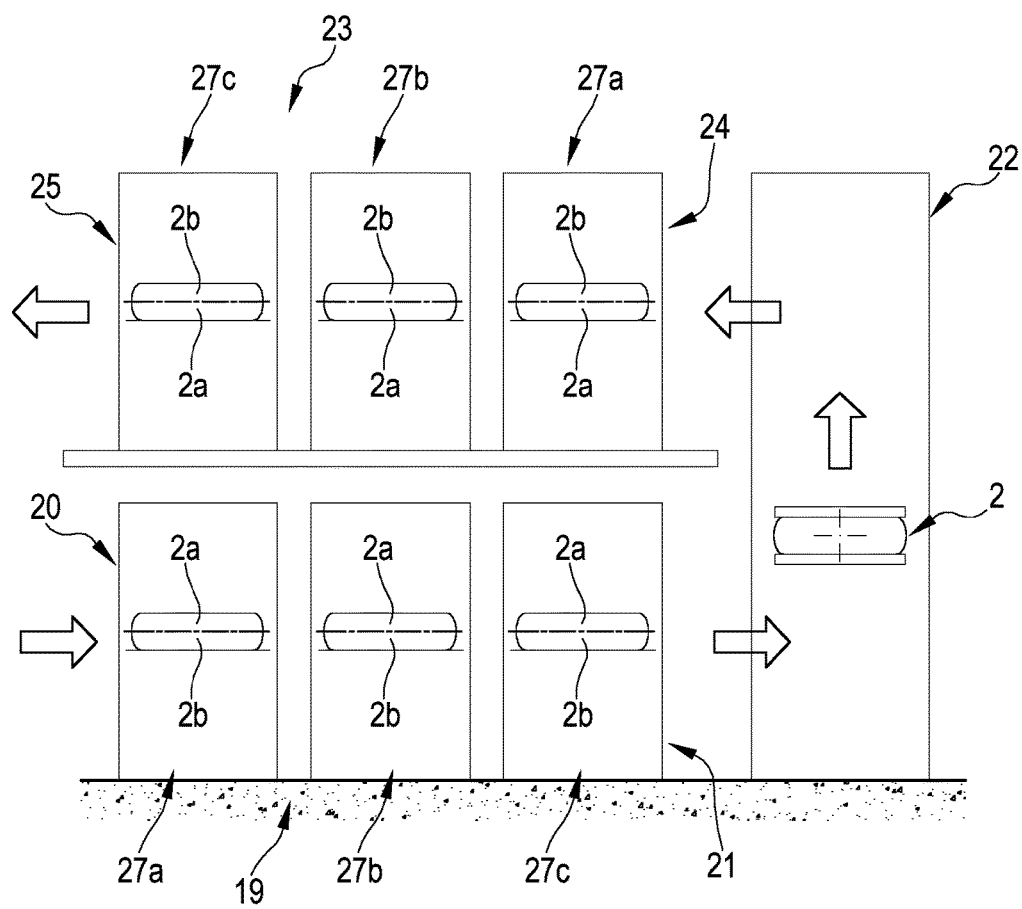
FIG. 3 illustrates an elevation view of a different embodiment of the apparatus illustrated in FIG. 2.

In the embodiments of FIGS. 1, 2 and 3, such apparatus 18, for checking the tyres placed downstream of the moulding and vulcanisation unit 14, comprises a first check unit 19 which has an inlet 20 for the finished tyres 2 to be checked which come from the production line 12 and a respective outlet 21. Downstream of the first check unit 19, at the outlet 21 of said first check unit 19, an overturning and transport device 22 is placed. Downstream of the overturning and transport device 22, a second check unit 23 is positioned, which has an inlet 24 for the finished tyres 2 that come from the overturning and transport device 22 and a respective outlet 25. The inlet 20 of the first check unit 19 constitutes the inlet of the apparatus 18 for checking tyres. The outlet 25 of the second check unit 23 constitutes the outlet of the apparatus 18 for checking tyres. The tyres 2 to be checked enter one after the other in sequence in the inlet 20, sequentially follow a check path 26 to the interior of the apparatus 18 for checking tyres and exit through the outlet 25. Along the check path 26, which in the embodiment illustrated in FIGS. 1 and 2 is rectilinear, the tyres 2 are subjected to quality checks in order to verify the possible presence of defects according to modes that will be described hereinbelow.

In a non-illustrated embodiment variant, the first check unit 19 and the second check unit 23 are angled with respect to each other to define two rectilinear sections of the check path 26.

In a further embodiment variant illustrated in FIG. 3, the first check unit 19 and the second check unit 23 are mutually superimposed. The second check unit 23 is placed above the first check unit 19 and the overturning and transport device 22 is placed at terminal ends of said first check unit and the second check unit 19, 23. Said overturning and transport device 22 is also configured for lifting the tyres 2 in a manner so as to bring them from the first check unit 19 to the second check unit 23.

In all the above-described embodiments, the first check unit 19 comprises a first check station 27a, a second check station 27b and a third check station 27c placed in sequence, one after another, along the check path 26.

Each of the abovementioned check stations 27a, 27b, 27c comprises (FIG. 5 which illustrates the first check station 27a) a framework 28 having a lower portion 29 configured for being abutted against the ground and an upper portion 30 that is extended above the lower portion 29. The illustrated framework 28 is a frame formed by four vertical uprights 31 arranged, in plan view, at the vertices of a square or rectangle. The vertical uprights 31 are connected at the upper part, at the upper portion 30, by a pair of longitudinal upper crosspieces 32a (oriented parallel to the check path 26) and by a plurality of transverse upper crosspieces 32b (oriented perpendicular to the check path 26).

The same vertical uprights 31 are connected at the lower part, at the lower portion 29, by a plurality of longitudinal lower crosspieces 33a and by a plurality of transverse lower crosspieces 33b.

The lower crosspieces 33a, 33b carry a support 34 defined by a rotary table which has a substantially horizontal abutment zone 35 that is configured for receiving and supporting a sidewall 11 of the finished tyre 2 to be checked. Such abutment zone 35 may be defined by the upper branch of a conveyor belt 36, not illustrated in detail in the enclosed figures, constituting part of the support 34. The conveyor belt defines a transfer device 36 for transferring the tyres 2 from one check station 27a, 27b, 27c to a subsequent check station 27b, 27c of the same check unit 19, 23 or to the overturning and transport device 22.

Figure 5:
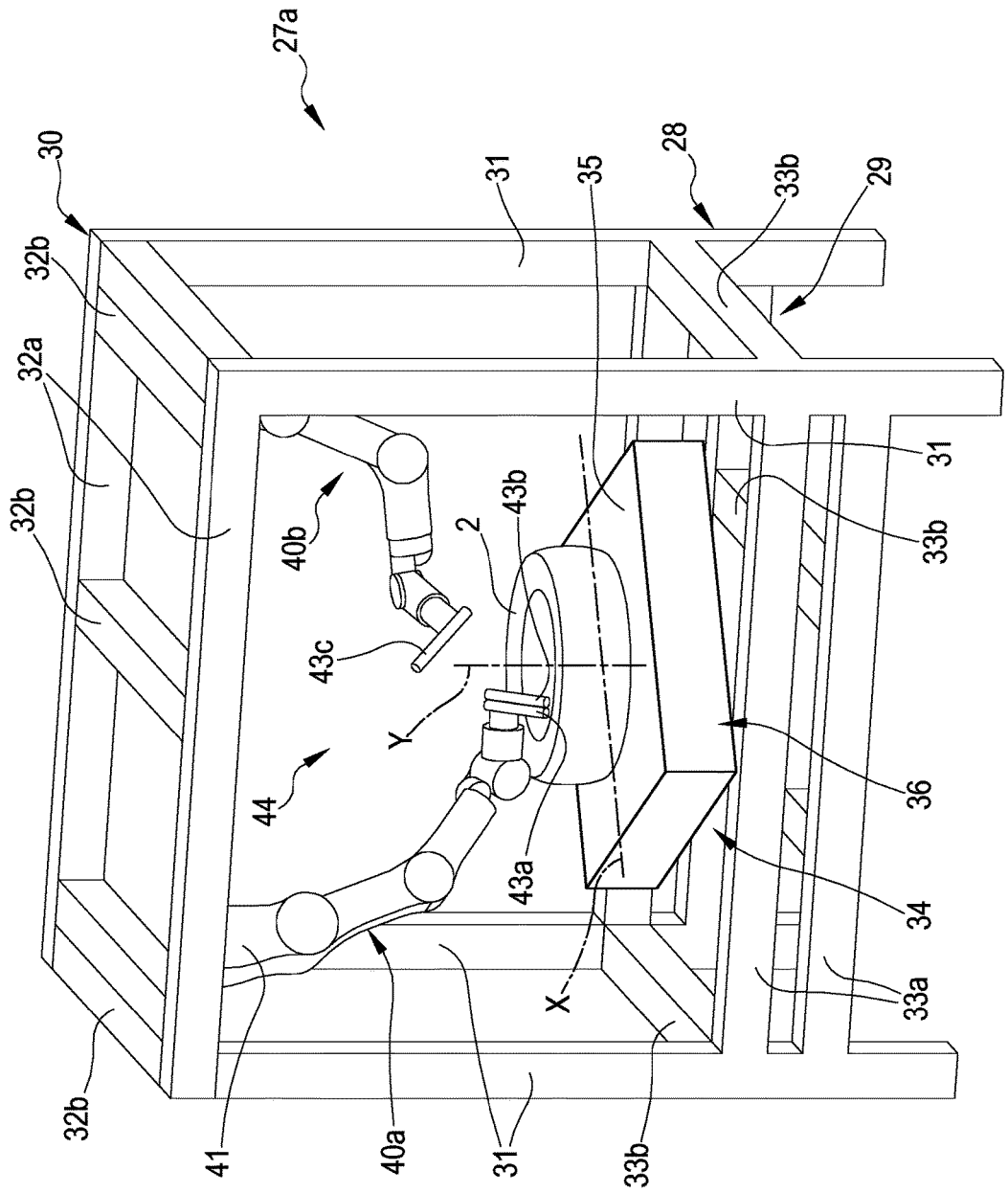
FIG. 5 illustrates a perspective view of an element belonging to the apparatuses of the preceding figures.

More in detail, in the embodiment schematised in FIG. 5, the support 34 comprises a rotary table hinged to the lower portion 29 around a vertical rotation axis "Y". The rotary table is preferably associated with the conveyor belt 36 which defines, during the translation movement thereof, a transport direction "X".

In a different embodiment, not illustrated, in place of the conveyor belt, multiple motorised rollers can be present on which the tyre 2 directly rests.

Two anthropomorphic robotic arms 40a, 40b are mounted above the support 34 and are constrained to the transverse upper crosspieces 32b. Each of the abovementioned anthropomorphic robotic arms 40a, 40b has a base portion 41 thereof joined to the transverse upper crosspieces 32b and a series of elements consecutively arranged, starting from the base portion 41, and connected by joints. The anthropomorphic robotic arms 40a, 40b for example have six or seven axes/degrees of freedom.

Each anthropomorphic robotic arm 40a, 40b is projectingly extended from the transverse upper crosspieces 32b above the abutment zone 35. In the illustrated embodiment, the two base portions 41 of the anthropomorphic robotic arms 40a, 40b are mounted at opposite longitudinal ends of the longitudinal upper crosspieces 32a and at opposite corners of the framework 28. Said base portions 41 therefore do not lie directly above the support 34 but are moved to opposite sides thereof.

A terminal end of each anthropomorphic robotic arm 40a, 40b carries one or more check tools 43a, 43b, 43c. Between the abutment zone 35 and the abovementioned transverse upper crosspieces 32b, the framework 28 delimits a manoeuvring space 44 for the anthropomorphic robotic arms 40a, 40b and for the check tools 43. The anthropomorphic robotic arms 40a, 40b define devices for supporting and moving the tools 43a, 43b, 43c.

The first check station 27a, the second check station 27b and the third check station 27c have the same above-described structure apart from the type of tools 43a, 43b, 43c, 43d, 43e, 43f, 43g, 43h carried by the respective anthropomorphic robotic arms 40a, 40b, 40c, 40d, 40e, 40f.

By way of example, a first anthropomorphic robotic arm 40a of the first check station 27a carries a first check tool 43a comprising a first digital camera and a light source, e.g. LED, adapted to illuminate the portion of the tyre 2 filmed by the first digital camera with diffuse light and/or light directed substantially as the optical axis of the first camera or with a grazing light and/or light directed tilted with respect to the optical axis of said first camera. The same first anthropomorphic robotic arm 40a also carries a second check tool 43b comprising a second camera and a laser directed light tilted with respect to the optical axis of said second camera, in a manner so to be able to underline particular profiles of the tyre 2, for example on the radially inner portion of the tread band 9 or on the radially outer portion of the sidewall 11.

A second anthropomorphic robotic arm 40b of the first check station 27a carries a single third check tool 43c comprising a third digital camera and a light source spaced from the third camera (for example by means of a suitable small framework) and oriented according an angle preferably comprised between about 60° and about 100°, e.g. about 90° with respect to the optical axis of said third camera, so as to project a grazing light on the tyre 2 capable of underlining defects of the tyre 2 itself in relief, for example cords emerging between the blocks of the tread band 9. The same check tool 43b preferably comprises a low resolution scanner, so to be able to scan particular profiles of the tyre 2, for example the radially inner portion of the tread band 9.

A third anthropomorphic robotic arm 40c belonging to the second check station 27b carries a fourth check tool 43d similar or identical to the first check tool 43a and comprising a fourth digital camera and a light source adapted to illuminate the portion of the tyre 2 filmed by the fourth digital camera with diffuse light and/or light directed substantially as the optical axis of the fourth camera or with a grazing light and/or light directed tilted with respect to the optical axis of said fourth camera. The same third anthropomorphic robotic arm 40c also carries a fifth check tool 43e comprising a fifth camera and a laser light directed tilted with respect to the optical axis of said fifth camera so to be able to underline particular profiles of the tyre 2, e.g. the radially outer portion of the tread band 9 or of the bead 7.

A fourth anthropomorphic robotic arm 40d belonging to the second check station 27b carries a single sixth check tool 43f comprising a sixth camera and laser light directed tilted with respect to the optical axis of said sixth camera, so as to be able to underline particular profiles of the tyre 2, e.g. of the sidewall 11. The sixth check tool 43f also comprises a mirror that intercepts the optical axis of the sixth camera in order to frame radially inner portions of the tyre 2, for example relative to the sidewall 11, to the shoulder 5 or to the bead 7. The aforesaid mirror also intercepts the laser light, projecting it towards the framed field.

A fifth anthropomorphic robotic arm 40e belonging to the third check station 27c carries a single seventh check tool 43g similar or identical to the first check tool 43a and comprising a seventh digital camera and a light source adapted to illuminate the portion of the tyre 2 filmed by the seventh digital camera with diffuse light and/or light directed substantially as the optical axis of the seventh camera or with a grazing light and/or light directed tilted with respect to the optical axis of said seventh camera.

A sixth anthropomorphic robotic arm 40f belonging to the third check station 27c carries an eighth check tool 43h, it too similar or identical to the first check tool 43a and comprising an eighth digital camera and a light source adapted to illuminate the portion of the tyre 2 filmed by the eighth digital camera with diffuse light and/or light directed substantially as the optical axis of the eighth camera or with a grazing light and/or light directed tilted with respect to the optical axis of said eighth camera. Said eighth check tool 43h also comprises a mirror which intercepts the optical axis of the eighth camera in order to frame radially inner portions of the tyre 2.

In the third check station 27c, a pressure element 42 is also installed, for example a roller or a wheel, moved by an electric, pneumatic or hydraulic actuator, constrained to the framework 28 and independent of the anthropomorphic robotic arms. Such pressure element 42 is pressed against the sidewall 11 of the tyre 2 in order to underline possible structural defects of the sidewall ("weak sidewall" defect check).

Also the second check unit 23 comprises a first check station 27a, a second check station 27b and a third check station 27c placed in sequence, one after the other along the check path 26. Said check stations 27a, 27b, 27c of the second check unit 23 have been attributed with the same reference numbers as the check stations 27a, 27b, 27c of the first check unit 19 since they are substantially identical to said check stations 27a, 27b, 27c of the first check unit 19 (including the check tools 43a, 43b, 43c, 43d, 43e, 43f, 43g, 43h). Hence they will not be described in detail hereinbelow.

Figure 6:
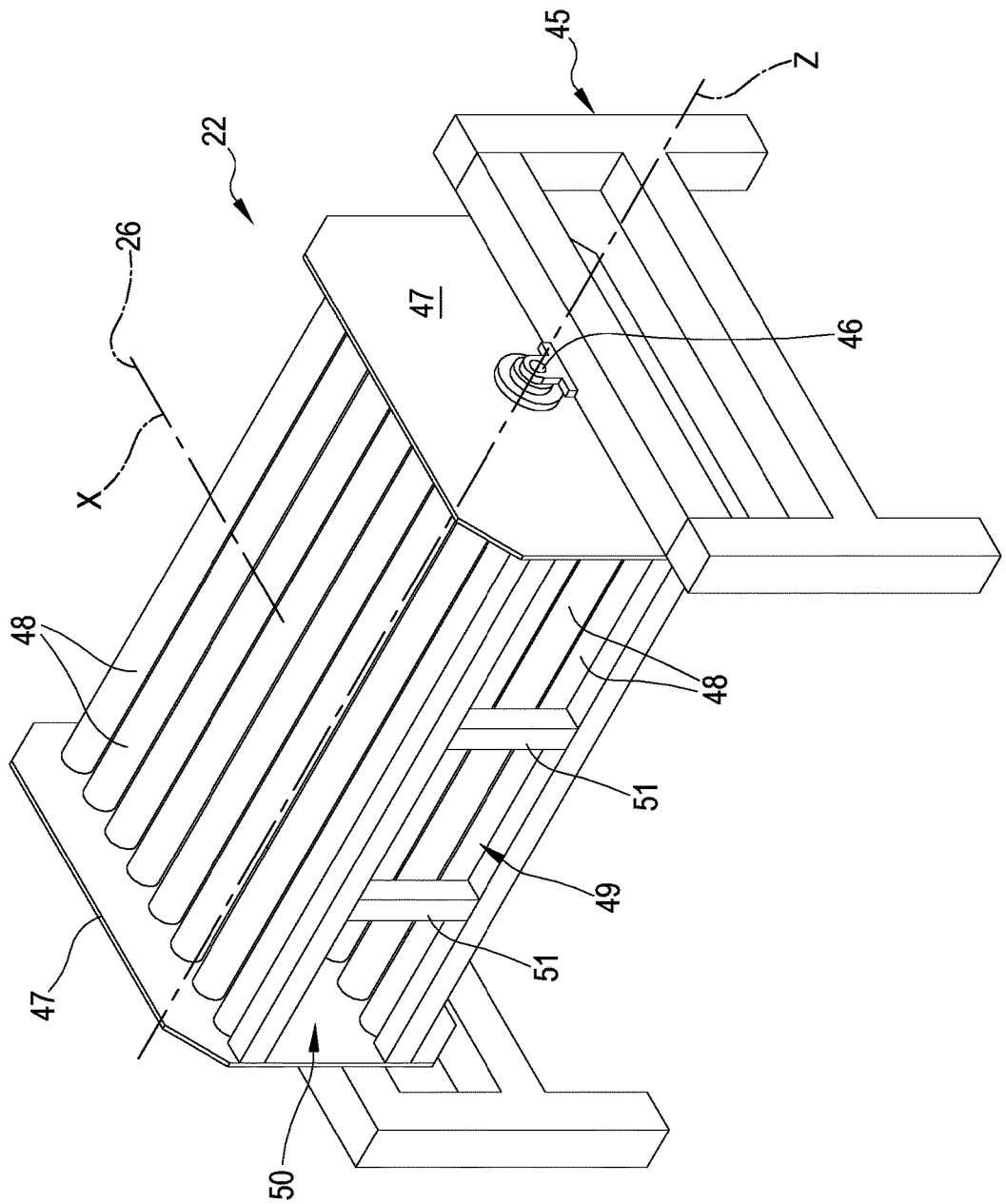
FIG. 6 illustrates a perspective view of a different element belonging to the apparatus of FIG. 2.

The overturning and transport device 22 comprises (FIG. 6) a respective framework 45 configured for resting on the ground. The framework 45 carries—hinged thereto, around overturning pins 46 defining a horizontal overturning axis "Z"—a pair of parallel and spaced lateral walls 47. In the illustrated embodiment, the walls 47 are vertical lateral plates. Between the walls 47, two series of conveyor rollers 48 are extended, rotatably coupled to said walls 47. Each series comprises a plurality of conveyor rollers 48 that are parallel, horizontal and lying on a same plane, in a manner so as to define a support with a movable transport surface for a tyre 2. Alternatively, in place of the two series of conveyor rollers 48, two conveyor belts can be present. The two series of the abovementioned conveyor rollers 48 are mutually spaced and a seat 49 is delimited between these for the reception of a tyre 2 to be overturned. The seat 49 has opposite openings 50 for allowing the transit of the tyre 2, as will be detailed hereinbelow. One or both openings 50 of the space 49 is selectively closed by a stop element 51, e.g. a kind of gate, movable between a closure position and an open position.

A motor, not illustrated, is operatively connected to the lateral walls 47 in order to make the assembly formed by the walls 47 themselves and by the conveyor rollers 48 rotate around the overturning axis "Z". Said assembly formed by the supports 47 and by the conveyor rollers 48 is movable around said overturning axis "Z" between a first position, in which the conveyor rollers 48 of one series are placed below and parallel to the ground, and a second position, in which the conveyor rollers 48 of the other series are placed below.

When it is in the seat 49, the tyre 2 lies abutted against the sidewall 11 on the series of conveyor rollers 48 situated below. A further motor, not illustrated, is operatively connected to at least one of the conveyor rollers 48, in order to thus make them rotate and translate the tyre 2 that lies in contact thereon. The stop element 51 serves to prevent, during overturning, the tyre 2 from falling outside the overturning and transport device 22.

In the embodiment of FIGS. 1 and 2, the overturning and transport device 22 is placed between the third check station 27c belonging to the first check unit 19 and the first check station 27a belonging to the second check unit 23. The overturning axis "Z" is perpendicular to the check path 26 and, in the first or second position, the conveyor rollers 48 of the series placed below are situated substantially at the same height as the abutment zone 35 of the third check station 27c belonging to the first check unit 19 and of the first check station 27a belonging to the second check unit 23.

The first check unit 19 may also comprise a barcode reader, not illustrated, placed at the inlet 20 and configured for reading a barcode identifying the entering tyres 2, placed on each of said tyres 2. An analogous barcode reader may also be placed at the outlet 25 of the second check unit 23 for a further identification check. The readers may be arranged on an upper or lower portion of the framework of the first check station 27a of the first check unit 19 and of the third check station 27c of the second check unit 23 in order to read barcodes placed on an upper sidewall or on a lower sidewall of the tyres 2.

In addition, one or more fixed auxiliary cameras with low resolution, not illustrated, are placed at the inlet 20 of the first check unit 21 and/or at the inlet 24 of the second check unit 23 for a first preliminary check of the tyres adapted to underline macro-defects, for example.

The apparatus 18 for checking tyres is also provided with an electronic management unit, not illustrated, operatively connected to the anthropomorphic robotic arms 40a, 40b, 40c, 40d, 40e, 40f, of the first check unit 19 and of the second check unit 23, to the check tools 43a, 43b, 43c, 43d, 43e, 43f, 43g, 43h, to the motors 38 that allow the rotation of the supports 34, to the motors that move the conveyor belts 36, to the possible further check tools and possible sensors arranged on the apparatus 18 itself, to the motors of the overturning and transport device 22.

Said electronic management unit can be the same electronic management unit of the entire plant 1 or it can be operatively connected to one or more other units dedicated to other parts of the plant 1. The electronic management unit manages the functioning of the apparatus 18 for checking tyres in coordination with the production line 12 placed upstream.

During use and in accordance with the method for checking tyres according to the present invention (and with reference to FIGS. 1 and 2), each time a finished tyre 2 exits from the vulcanisation unit 14, this is transferred, e.g. through a conveyor, to the first check station 27a of the first check unit 19. The tyre 2 not mounted on a rim (hence deflated) is set with a sidewall 11 on the upper branch of the respective conveyor belt 36. The abovementioned conveyor belt 36 is oriented in a manner such that its transport direction "X" coincides with the direction of the check path 26. The tyre 2 set on the sidewall 11 has its second axial half 2b adjacent to the conveyor belt 36 and the first axial half 2a directed upward.

During the entrance into the first check station 27a of the first check unit 19, the barcode reader reads the code reported, for example, on the sidewall 11 of the tyre 2 directed upward and the data reported therein is received by the electronic management unit which therefore, based for example on the tyre 2 type, sets (if the tyre 2 exiting from the production line 12 is the first) a predefined check program or verifies that the program that it is executing is the correct program for that tyre 2.

The tyre 2, which an instant before lay outside the first check station 27a, is moved a step of duration "Ts" of about 5 s and brought by the conveyor belt 36 up to the centre of the support 34. The conveyor belt 36 is then stopped and the translation of the tyre 2 is stopped therewith.

The tyre 2 remains in said first check station 27a for a first time interval. During the duration "Ti1" of said first time interval, a plurality of operations are executed on the tyre 2.

First of all, the electronic management unit executes a centring routine in a manner so as to make the reference system of the tyre 2 (with centre in the main rotation axis "X-X" of the tyre 2) correspond with the centre of the reference system of the first and second anthropomorphic robotic arm 40a, 40b and of the first, second and third check tool 43a, 43b, 43c. The centring routine has a duration "Tcent" of about 2 s.

Subsequently, the first and the second anthropomorphic robotic arm 40a, 40b are moved in the manoeuvring space 44 until the respective first, second and third check tool 43a, 43b, 43c are brought to the tyre 2.

In particular, the first anthropomorphic robotic arm 40a is brought into a position in which the first digital camera of the first tool 43a is placed above the tyre 2, across from a radially outer portion of the sidewall 11 of the tyre 2 and the second camera of the second tool 43b frames an adjacent portion of the same sidewall 11. The second anthropomorphic robotic arm 40b is brought into a position in which the third digital camera of the third tool 43c is brought into a radially inner position with respect to the tyre 2 and frames, from the interior, a portion of the tyre 2 belonging to the first axial half 2a directed upward of said tyre 2 placed at the tread, i.e. the liner 5. The time necessary for such movement of the first and second anthropomorphic robotic arm 40a, 40b has a duration "Tmov" of about 1 s.

Subsequently, by keeping the check tools 43a, 43b, 43c in fixed position, the tyre 2 is made to rotate by means of the support 34 around its main rotation axis "X-X" with a predefined and constant peripheral speed (the speed is invariant with the variation of the diameter of the tyres 2 to be checked) of about 0.5 m/s until it completes a rotation by a rotation angle of about 370°.

For example, for a tyre 2 of type 255/55 R19, such predefined peripheral speed corresponds to an angular rotation speed of about 1.33 rad/s.

During such rotation, the abovementioned portions are illuminated and run in front of the cameras, which acquire the received image sequence. Since the rotation angle is greater than the round angle, the first and the last images are doubles. During such rotation, which constitutes a first check cycle and which has a duration "Tc1" of about 5 s, three checks are executed.

At this point, the first and the second anthropomorphic robotic arm 40a, 40b are actuated again (Tmov=1 s) until the respective first, second and third check tool 43a, 43b, 43c are brought into different positions with respect to the first check cycle.

In particular, the first anthropomorphic robotic arm 40a is brought into a position in which the first digital camera of the first tool 43a is placed in front of an outer portion of the shoulder of the tyre 2 and the second camera of the second tool 43b frames an adjacent portion of the same shoulder. The second anthropomorphic robotic arm 40b is brought into a position in which the third digital camera of the third tool 43c is brought outside the tyre 2 and frames, from the outside, the bead belonging to the first axial half 2a directed upward.

Subsequently, by keeping the check tools 43a, 43b, 43c in a fixed position, the tyre by means of the support 34 is once again made to rotate around the main rotation axis "X-X" thereof with the abovementioned peripheral speed until it is made to complete the rotation of about 370°. During such rotation, which constitutes a second check cycle and which has a duration "Tc2" of about 5 s, three other checks are executed.

At this point, the first and the second anthropomorphic robotic arm 40a, 40b are moved again (Tmov=1 s) and a third check cycle is started, during which three further three checks are executed for a duration "Tc3" of the third check cycle of about 5 s. The first digital camera of the first tool 43a is placed in front of a radially inner portion of the tyre (liner) belonging to the first axial half 2a directed upward and the second camera of the second tool 43b frames an adjacent portion of the same liner, still belonging to the first axial half 2a directed upward. The second anthropomorphic robotic arm 40b is brought into a position in which the third digital camera of the third tool 43c frames, from the outside, a portion of the tread belonging to the first axial half 2a directed upward.

At the end of such third check cycle, the first and the second anthropomorphic robotic arm 40a, 40b are once again moved (Tmov=1 s) and a fourth check cycle is started, whose duration "Tc4" is still about 5 s, during which three further checks are executed. The first digital camera of the first tool 43a is placed in front of a further radially inner portion of the tyre (liner) belonging to the first axial half 2a directed upward and the second camera of the second tool 43b frames an adjacent portion of the same liner, still belonging to the first axial half 2a directed upward. The second anthropomorphic robotic arm 40b is brought into a position in which the third digital camera of the third tool 43c is placed in a radially outer position with respect to the tyre 2 and frames, from the outside, a different portion of the tread belonging to the first axial half 2a directed upward.

Once the fourth check cycle has terminated, the first and the second anthropomorphic robotic arm 40a, 40b are moved away from the tyre 2 (Tmov=1 s).

At the end of the fourth check cycle, twelve checks are carried out in the first check station 27a and in the arc of the first time interval. The duration "Ti1" of said first time interval is about 27 s (Ti1=Tcent+Tmov+Tc1+Tmov+Tc2+Tmov+Tc3+Tmov+Tc4+Tmov).

As can be observed, during the four check cycles and the twelve checks, the first, the second and the third check tool 43a, 43b, 43c always remain anchored to the respective first and second anthropomorphic robotic arm 40a, 40b.

All twelve checks were executed on portions of the first axial half 2a directed upward of the tyre 2 since they can be easily reached by the check tools 43a, 43b, 43c which are hung above the tyre 2 itself.

At this point, the rotation of the tyre 2 is stopped and the conveyor belt 36 of the first check station 27a, on which the tyre 2 lies, is moved together with the conveyor belt 36 of the second check station 27b until the tyre 2, still abutted against the same sidewall 11, is made to complete a step along the check path 26 and is brought substantially to the centre of the support 34 of said second check station 27b. The duration of said step "Ts" is about 5 s. The conveyor belt 36 is then stopped, and with this the translation of the tyre 2 that it houses also stops.

The tyre 2 remains in said second check station 27b for a second time interval still with its first axial half 2a directed upward. During the duration "Ti2" of said second time interval, a plurality of operations are executed on the tyre 2.

First of all, the electronic management unit once again executes the centring routine which has a duration "Tcent" of about 2 s.

Subsequently, the third and the fourth anthropomorphic robotic arm 40c, 40d are actuated until the respective fourth, fifth and sixth check tool 43d, 43e, 43f are brought to the tyre 2 (Tmov=1 s).

In particular, the third anthropomorphic robotic arm 40c is brought into a position in which the fourth digital camera of the fourth tool 43d is placed above or in radially outer position with respect to the tyre 2, in front of a radially outer portion of the bead 7 belonging to the first axial half 2a and the fifth camera of the fifth tool 43e frames an adjacent portion of the same bead 7.

The fourth anthropomorphic robotic arm 40d is brought into a position in which the sixth digital camera of the sixth tool 43f is brought within the tyre 2 and frames, from the interior, a radially inner portion of the same bead 7 of the tyre 2 belonging to the first axial half 2a.

Subsequently, by keeping the check tools 43d, 43e, 43f in fixed position, the tyre 2 by means of the support 34 is made to rotate around its main rotation axis "X-X" with a predefined and constant peripheral speed of about 0.5 m/s, until it is made to complete a rotation by a rotation angle of about 370°. During such rotation, the abovementioned portions are illuminated and slide in front of the cameras which acquire the sequence of received images. Since the rotation angle is greater than the round angle, the first and last images are double. During such rotation, which constitutes a fifth check cycle and which has a duration "Tc5" of about 5 s, three checks are executed.

At this point, the third and the fourth anthropomorphic robotic arm 40c, 40d are once again actuated until the respective fourth, fifth and sixth check tool 43d, 43e, 43f are brought into different positions with respect to the fifth check cycle (Tmov=1 s).

In particular, the third anthropomorphic robotic arm 40c is brought above the tyre 2, into a position in which the fourth digital camera of the fourth tool 43d is placed in front of a radially outer portion of the sidewall 11 of the tyre 2 and the fifth camera of the fourth tool 43e frames an adjacent portion of the same sidewall 11. The fourth anthropomorphic robotic arm 40d is brought into a position in which the sixth digital camera of the sixth tool 43f is brought inside the tyre 2 and frames, from the interior, the portion of the carcass structure corresponding to the sidewall 11 belonging to the first axial half 2a directed upward.

Subsequently, by keeping the check tools 43d, 43e, 43f in fixed position, the tyre 2 by means of the support 34 is once again made to rotate around its main rotation axis "X-X" with the abovementioned peripheral speed until it is made to complete the rotation of about 370°. During such rotation, which constitutes the sixth check cycle and which has a duration "Tc6" of about 5 s, three other checks are executed.

At this point, the third and the fourth anthropomorphic robotic arm 40c, 40d are once again moved (Tmov=1 s) and a seventh check cycle is started, during which three further checks are executed, for a duration "Tc7" of the seventh check cycle of about 5 s.

The fourth digital camera of the fourth tool 43d is placed in radially outer position with respect to the tyre 2, in front of a radially outer portion of the tread 9 belonging to the first axial half 2a directed upward and the fifth camera of the fifth tool 43e frames an adjacent portion of the same tread 9, still belonging to the first axial half 2a. The fourth anthropomorphic robotic arm 40d is brought into a position in which the sixth digital camera of the sixth tool 43f frames, from the interior, a portion of the carcass structure corresponding to the sidewall 11 belonging to the first axial half 2a directed upward.

At the end of such seventh check cycle, the third and the fourth anthropomorphic robotic arm 40c, 40d are moved once again (Tmov=1 s) and an eighth check cycle is started, whose duration "Tc8" is still about 5 s, during which three further checks are executed.

The fourth digital camera of the fourth tool 43d is placed in front of a further radially outer portion of the tread 9 belonging to the first axial half 2a directed upward and the fifth camera of the fifth tool 43e frames an adjacent portion of the same tread 9, still belonging to the first axial half 2a directed upward. The fourth anthropomorphic robotic arm 40d is brought into a position in which the sixth digital camera of the sixth tool 43f is placed in a radially inner position with respect to the tyre 2 and frames, from the interior, a portion of the shoulder belonging to the first axial half 2a directed upward.

At the end of the eighth check cycle, twelve checks are carried out in the second check station 27b and in the arc of the second time interval. The duration "Ti2" of said second time interval is about 27 s (Ti2=Tcent+Tmov+Tc5+Tmov+Tc6+Tmov+Tc7+Tmov+Tc8+Tmov).

As can be observed, during the four check cycles and the twelve checks, the fourth, the fifth and the sixth check tool 43d, 43e, 43f always remain anchored to the respective third and fourth anthropomorphic robotic arm 40c, 40d.

Also these twelve checks were executed on portions of the first axial half 2a directed upward of the tyre 2, since they can be easily reached by the check tools 43d, 43e, 43f which are hung above the tyre itself 2.

At this point, the rotation of the tyre 2 is stopped and the conveyor belt 36 of the second check station 27b, on which the tyre 2 lies, is moved together with the conveyor belt 36 of the third check station 27c until the tyre 2, still abutted against the same sidewall 11, is made to complete a step along the check path 26 and is brought substantially to the centre support 34 of said third check station 27c. The duration of said step "Ts" is about 5 s. The conveyor belt 36 is then stopped, and with this the translation of the tyre 2 also stops.

The tyre 2 remains in said third check station 27c for a third time interval, still with its first axial half 2a directed upward. During the duration "Ti3" of said third time interval, a plurality of operations are executed on the tyre 2.

First of all, the electronic management unit once again executes the centring routine, which has a duration "Tcent" of about 2 s.

Subsequently, the fifth and the sixth anthropomorphic robotic arm 40e, 40f are actuated until the respective seventh and eighth check tool 43g, 43h are brought to the tyre 2 (Tmov=1 s).

In particular, the fifth anthropomorphic robotic arm 40e is brought into a position in which the seventh digital camera of the seventh tool 43g is placed above the tyre 2, in front of a radially outer portion of the sidewall 11 belonging to the first axial half 2a. The sixth anthropomorphic robotic arm 40f is brought into a position in which the eighth digital camera of the eighth tool 43h is brought within the tyre 2 and frames, from the interior, a portion of the shoulder of the tyre 2 belonging to the first axial half 2a.

In addition, the pressure element 42 is lowered and pressed against the sidewall 11.

Subsequently, by keeping the check tools 43g, 43h in fixed position, and the pressure element 42 pressed against the sidewall 11, the tyre 2 by means of the support 34 is made to rotate around its main rotation axis "X-X" with a predefined and constant peripheral speed of about 0.5 m/s until it is made to complete a rotation by a rotation angle of about 370°. During such rotation, the abovementioned portions are illuminated and run in front of the cameras, which acquire the sequence of received images. Since the rotation angle is greater than the round angle, the first and the last images are double. During such rotation, which constitutes a ninth check cycle and which has a duration "Tc9" of about 5 s, two checks are executed.

At this point, the fifth and the sixth anthropomorphic robotic arm 40e, 40f are once again actuated until the respective seventh and eighth check tool 43g, 43h are brought into different positions with respect to the ninth check cycle while the pressure element 42 remains pressed against the sidewall 11 (Tmov=1 s).

In particular, the fifth anthropomorphic robotic arm 40e is brought above or in any case in radially outer position with respect to the tyre 2, into a position in which the seventh digital camera of the seventh tool 43g is placed in front of a radially outer portion of the bead 7 of the tyre 2. The sixth anthropomorphic robotic arm 40f is brought into a position in which the eighth digital camera of the eighth tool 43h is brought within the tyre 2 and frames, from the interior, the bead 7 belonging to the first axial half 2a directed upward.

Subsequently, by keeping the check tools 43g, 43h in fixed position and the pressure element 42 pressed against the sidewall 11, the tyre 2 by means of support 34 is once again made to rotate around its main rotation axis "X-X" with the abovementioned peripheral speed until it is made to complete the rotation of about 370°. During such rotation, which constitutes a tenth check cycle and which has a duration "Tc10" of about 5 s, two other checks are executed.

At this point, the fifth, the sixth anthropomorphic robotic arm 40e, 40f are once again moved (Tmov=1 s) and an eleventh check cycle is started during which a further check is executed (for a duration "Tc11" of the eleventh check cycle of about 5 s).

The seventh digital camera of the seventh tool 43g is placed in rest position above the tyre 2, since in this eleventh check cycle the eighth tool 43h is not used.

The sixth anthropomorphic robotic arm 40f is brought into a radially inner position with respect to the tyre 2, in front of an inner portion of the sidewall 11 belonging to the first axial half 2a directed upward.

The fifth and the sixth anthropomorphic robotic arm 40e, 40f are once again moved (Tmov=1 s) and a twelfth check cycle is started (whose duration "Tc12" is still about 5 s) during which two further checks are executed.

The seventh digital camera of the seventh tool 43g is placed in front of a radially outer portion of the shoulder belonging to the first axial half 2a directed upward. The eighth anthropomorphic robotic arm 40f is brought into a position in which the eighth digital camera of the eighth tool 43h is placed in a radially inner position with respect to the tyre 2 and frames, from the interior, a portion of the carcass structure corresponding to the sidewall 11 belonging to the first axial half 2a directed upward.

At the end of the twelfth check cycle, seven checks are carried out in the third check station 27c and in the arc of the third time interval. The duration "Ti3" of said third time interval is still about 27 s (Ti3=Tcent+Tmov+Tc9+Tmov+Tc10+Tmov+Tc11+Tmov+Tc12+Tmov).

As can be observed, during the four check cycles and the seven checks, the seventh and the eighth check tool 43g, 43h always remain anchored to the respective fifth and sixth anthropomorphic robotic arm 40e, 40f.

Also these seven checks were executed on portions of the first axial half 2a directed upward of the tyre 2, since they are easily reachable by the check tools 43g, 43h that are hung above the tyre itself 2.

In the first check unit 19 and along a first part 26a of the check path 26 defined by said first unit 19, the first axial half 2a of the tyre 2 is subjected a thirty one checks in a total time (adding together the time durations "Ti1-Ti3" of the time intervals and of the steps "Ts") of about 96 s.

All the illustrated checks are of optical type and cover the entire surface (inner and outer) of the first axial half 2a.

More generally, such checks can be of optical type (e.g. photography, shearography, holography, radiography, etc.), ultrasonic type, mechanical type or a combination thereof.

At this point, the rotation of the tyre 2 is stopped and the conveyor belt 36 of the third check station 27c, on which the tyre 2 lies, is moved together with the conveyor rollers 48 of the overturning and transport device 22 until the tyre 2, still abutted against the same sidewall 11, is made to complete a step along the check path 26 and to bring it substantially to the centre of the overturning and transport device 22. In this manner, the overturning axis "Z" passes close to or intersects the main rotation axis "X-X" of the tyre 2.

The tyre 2 enters through one of the openings 50 while the other is closed by the stop element 51. The duration of said step "Ts" is about 5 s. The conveyor belt 36 and the conveyor rollers 48 are then stopped and with them the translation of the tyre 2 is stopped.

The assembly formed by the lateral walls 47, by the conveyor rollers 48 and by the tyre 2 is overturned 180° around the overturning axis "Z". The first axial half 2a of the tyre 2 placed above now lies towards the bottom with the respective sidewall 7 rested on the conveyor rollers 48. The second axial half 2b of the tyre 2 placed below is now directed upward. During the overturning, the stop element 51 prevents the tyre 2 from slipping outside the overturning and transport device 22.

Even if the overturning is actuated in a very brief time period, the tyre 2 remains in the overturning and transport device 22 for a time period equal to the longest time interval duration "Ti1, Ti2, Ti3" of the three mentioned above. In the illustrated case, all three intervals have the same duration and the stay time has a duration "Tt" of about 27 s.

Subsequently, by actuating conveyor rollers 48 and the conveyor belt 36 of the first check station 27a belonging to the second check unit 23, the tyre 2 is transferred (Ts=5 s) to said second check unit 23 where the second half 2b thereof is subjected to the same checks as the first axial half 2a along a second part 26b of the check path 26, with the modes and times described above for said first axial half 2a (same number of time intervals, of check cycles, of checks, same sequence of checks, etc.).

At the outlet from the second check unit 23, both the axial halves 2a, 2b have been carefully checked. The total transit time "Ttran" of the tyre 2 through the check path 26 is about 202 s (Ttran=Ts+Ti1+Ts+Ti2+Ts+Ti3+Ts+Tt+Ts+Ti1+Ts+Ti2+Ts+Ti3+Ts).

In operating conditions, each check station 27a, 27b, 27c, both of the first and of the second check unit 19, 23 and the overturning and transport device 22 houses a tyre 2 exiting in sequence from the vulcanisation unit 14. Said tyres 2 are advanced simultaneously and step by step along the check path 26 from one check station to the other 27a, 27b, 27c or to the overturning and transport device 22 ("pilgrim-step" movement). Each of said steps has the above-indicated duration (Tmov=5 s). Between subsequent steps, said tyres 2 remain in the respective check stations 27a, 27b, 27c or in the overturning and transport device 22 for the same time (Ti1=Ti2=Ti3=Tt=27 s).

This signifies that every 27 s, a tyre 2 enters into the apparatus 18 for checking tyres and a tyre 2 exits from said apparatus 18. The check cycle time "Tcc" that elapses between the exit of one tyre 2 checked by the apparatus 18 for checking tyres and the exit of the subsequent tyre 2 is therefore about 27 s (Tcc=Ti1=Ti2=Ti3=Tt=27 s). Said check cycle time "Tcc" is thus substantially equal to the production cycle time "Tcp" so that the production line 12 can be synchronised with the apparatus 18 for checking tyres. Each tyre 2 exiting from the production line 12 can enter directly into the apparatus 18 for checking tyres without requiring intermediate compensation zones (buffers). Analogously, in the above-illustrated different embodiment, if the apparatus 18 for checking tyres is provided downstream of the building apparatus 13 before the moulding and vulcanisation unit 14 and the building cycle time is substantially equal to the check cycle time, the building apparatus 13 would be synchronisable with said apparatus 18, so that also each tyre 2 exiting from the building apparatus 13 could directly enter into the apparatus 18 itself without requiring intermediate compensation zones (buffers).

The same sequence of steps as described above is also actuated by the apparatus of the embodiment of FIG. 3. The only difference is that the overturning and transport device 22, in addition to overturning the tyre 2, also lift the tyre 2 up to the height of the second check unit 23 and lower it again after having unloaded the tyre 2 itself.

Figure 4:
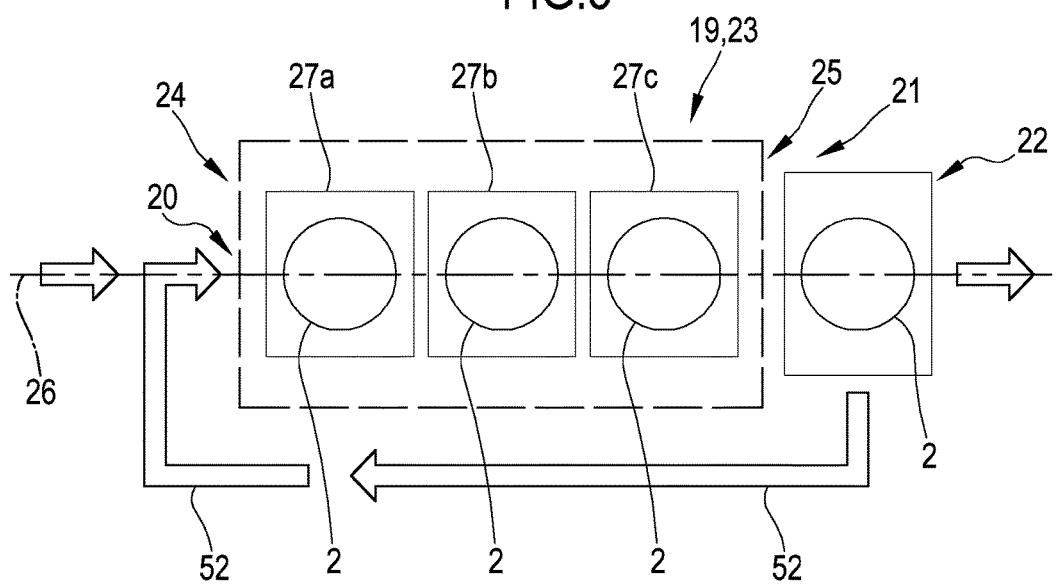
FIG. 4 illustrates a plan view of a further embodiment of the apparatus illustrated in FIG. 2.

A further embodiment variant of the apparatus 18 for checking tyres, illustrated in FIG. 4, comprises a single check unit 19, 23, which carries out the function of the first and the second check unit 19, 23 described above, and the overturning and transport device 22. Said single check unit 19, 23 comprises the three check stations 27a, 27b, 27c placed in sequence and described above in detail. The apparatus 18 for checking tyres also comprises auxiliary transport devices 52, for example further conveyor belts schematically represented with the arrows in FIG. 4, operatively interposed between the outlet 21, 25 of said single check station 19, 25 and the inlet 20, 24 thereof. The auxiliary transport devices 52 are configured for transporting the tyres 2 exiting from the single check station 19, 23 once again to the inlet thereof.

In one variant of the method, actuated for example by means of the apparatus of FIG. 4, each tyre 2 (as mentioned above) a first time traverses step by step the single check station 19, 23, abutted against a sidewall 11 and with the first axial half 2a directed upward. The tyre 2 is then overturned by the overturning and transport device 22 and reinserted in the single check unit 19, 23 where it traverses step by step, a second time, the same single check station 19, 23, abutted against the opposite sidewall 11 and with the second axial half 2b directed upward. The sequence of the checks is the same as described above.

Between a tyre 2 that comes from the production line 12 and the subsequent tyre 2 coming from the line 12, a tyre 2 is inserted in the check unit 19, 23 that is already partially checked (the first axial half 2a) and coming from the same check unit 19, 23.

In this embodiment, the check cycle time "Tcc" is about twice the production cycle time "Tcp".

Considering the abovementioned times (Ti1-3, Tc1-4, Ts, Tcent, Tmov) for the embodiment of FIGS. 1 and 2, the time that elapses between the exit of one tyre 2 from the apparatus 18 for checking tyres and the exit of the subsequent tyre 2 is still about 27 s (Ti1=Ti2=Ti3=Tt=27 s) but only one tyre 2 every two was completely checked (first and second axial half 2a, 2b). It follows that the check cycle time "Tcc" (time that elapses between the exit of one tyre 2 completely checked by the apparatus 18 for checking tyres and the exit of the subsequent completely checked tyre 2) is about 54 s.

Between the production line 12 and the apparatus 18 for checking the tyres, a storage or buffer is preferably arranged.

The invention claimed is:

1. A method for checking tyres, wherein each tyre has a main rotation axis and an axial centreline plane, said method comprising:
   simultaneously advancing said tyres step by step along a check path, and
   checking said tyres during time intervals placed between subsequent steps;
   checking at least one first half of each tyre by executing a plurality of checks along a first part of the check path, wherein the first half is an axial half of each tyre delimited by said axial centreline plane;
   overturning each tyre around an overturning axis after exiting from said first part of the check path;
   moving each tyre to an inlet of a second part of the check path; and
   checking at least one second half of each tyre by executing the plurality of checks along said second part of the check path, wherein the second half is an other axial half of each tyre delimited by said axial centreline plane.

2. The method as in claim 1, wherein said first part of the check path coincides with said second part of the check path.

3. The method as in claim 1, wherein said first part of the check path is separate from said second part of the check path.

4. The method as in claim 1, wherein a number of time intervals along the first part of the check path is equal to a number of time intervals along the second part of the check path.

5. The method as in claim 1, wherein an overall number of time intervals is between four and eight.

6. The method as in claim 1, wherein a sequence of checks along the first part of the check path is equal to a sequence of the checks along the second part of the check path.

7. The method as in claim 1, wherein the number of checks of said plurality of checks is between twenty and forty.

8. The method as in claim 1, wherein during each of said time intervals, each tyre is subjected to a plurality of successive check cycles.

9. The method as in claim 8, wherein during each of said time intervals, each tyre is subjected to a number of check cycles between two and eight.

10. The method as in claim 9, wherein during each of said check cycles, each tyre is rotated around the main rotation axis.

11. The method as in claim 8, wherein during each check cycle of said plurality of successive check cycles, check tools are arranged in fixed check positions while each tyre is rotated around the main rotation axis.

12. The method as in claim 11, wherein between a check cycle and a successive check cycle of said plurality of successive check cycles, the check tools are moved into different check positions.

13. The method as in claim 10, wherein during each of said check cycles, each tyre is rotated a rotation angle greater than 360° around the main rotation axis.

14. The method as in claim 8, wherein during each of said check cycles, each tyre is rotated at a peripheral speed predefined and independent of the size of each tyre.

15. The method as in claim 8, wherein during each of said check cycles, a plurality of checks is executed on each said at least one half of each tyre.

16. The method as in claim 15, wherein said plurality of checks is between two and six.

17. The method as in claim 1, wherein a check cycle time between an exit of a first tyre from the check path and an entrance of a second tyre into the check path is between about 25 s and about 35 s.

18. The method as in claim 1, wherein said overturning axis is perpendicular to said main rotation axis and belongs to said axial centreline plane.

19. A method for checking tyres, wherein each tyre has a main rotation axis and an axial centreline plane, said method comprising:

simultaneously advancing said tyres step by step along a check path, and checking said tyres during time intervals placed between subsequent steps;

checking at least one first half of each tyre by executing a plurality of checks along a first part of the check path, wherein the first half is an axial half of each tyre delimited by said axial centreline plane;

overturning each tyre around an overturning axis after exiting from said first part of the check path;

moving each tyre to an inlet of a second part of the check path; and checking at least one second half of each tyre by executing the plurality of checks along said second part of the check path, wherein the second half is an other axial half of each tyre delimited by said axial centreline plane;

wherein during each of said time intervals, each tyre is subjected to a plurality of successive check cycles;

wherein between a check cycle and a successive check cycle of said plurality of successive check cycles, the check tools are moved into different check positions.

20. The method as in claim 19, wherein said first part of the check path coincides with said second part of the check path.

21. The method as in claim 19, wherein said first part of the check path is separate from said second part of the check path.

22. The method as in claim 19, wherein a number of time intervals along the first part of the check path is equal to a number of time intervals along the second part of the check path.

23. The method as in claim 19, wherein an overall number of time intervals is between four and eight.

24. The method as in claim 19, wherein a sequence of checks along the first part of the check path is equal to a sequence of the checks along the second part of the check path.

25. The method as in claim 19, wherein the number of checks of said plurality of checks is between twenty and forty.

26. The method as in claim 19, wherein during each of said time intervals, each tyre is subjected to a number of check cycles between two and eight.

27. The method as in claim 19, wherein during each of said check cycles, each tyre is rotated around the main rotation axis.

28. The method as in claim 19, wherein during each of said check cycles, each tyre is rotated a rotation angle greater than 360° around the main rotation axis.

29. The method as in claim 19, wherein during each of said check cycles, each tyre is rotated at a peripheral speed predefined and independent of the size of each tyre.

30. The method as in claim 19, wherein during each of said check cycles, a plurality of checks is executed on each said at least one half of each tyre.

31. The method as in claim 30, wherein said plurality of checks is between two and six.

32. The method as in claim 19, wherein a check cycle time between an exit of a first tyre from the check path and an entrance of a second tyre into the check path is between about 25s and about 35s.

33. The method as in claim 19, wherein said overturning axis is perpendicular to said main rotation axis and belongs to said axial centreline plane.

34. A method for checking tyres, wherein each tyre has a main rotation axis and an axial centreline plane, said method comprising:

simultaneously advancing said tyres step by step along a check path, and checking said tyres during time intervals placed between subsequent steps;

checking at least one first half of each tyre by executing a plurality of checks along a first part of the check path, wherein the first half is an axial half of each tyre delimited by said axial centreline plane;

overturning each tyre around an overturning axis after exiting from said first part of the check path;

moving each tyre to an inlet of a second part of the check path; and checking at least one second half of each tyre by executing the plurality of checks along said second part of the check path, wherein the second half is an other axial half of each tyre delimited by said axial centreline plane;

wherein during each of said time intervals, each tyre is subjected to a plurality of successive check cycles;

wherein during each check cycle of said plurality of successive check cycles, check tools are arranged in fixed check positions while each tyre is rotated around the main rotation axis;

wherein between a check cycle and a successive check cycle of said plurality of successive check cycles, the check tools are moved into different check positions.

35. The method as in claim 34, wherein said first part of the check path coincides with said second part of the check path.

36. The method as in claim 34, wherein said first part of the check path is separate from said second part of the check path.

37. The method as in claim 34, wherein a number of time intervals along the first part of the check path is equal to a number of time intervals along the second part of the check path.

38. The method as in claim 34, wherein an overall number of time intervals is between four and eight.

39. The method as in claim 34, wherein a sequence of checks along the first part of the check path is equal to a sequence of the checks along the second part of the check path.

40. The method as in claim 34, wherein the number of checks of said plurality of checks is between twenty and forty.

41. The method as in claim 34, wherein during each of said time intervals, each tyre is subjected to a number of check cycles between two and eight.

42. The method as in claim 34, wherein during each of said check cycles, each tyre is rotated a rotation angle greater than 360° around the main rotation axis.

43. The method as in claim 34, wherein during each of said check cycles, each tyre is rotated at a peripheral speed predefined and independent of the size of each tyre.

44. The method as in claim 34, wherein during each of said check cycles, a plurality of checks is executed on each said at least one half of each tyre.

45. The method as in claim 44, wherein said plurality of checks is between two and six.

46. The method as in claim 34, wherein a check cycle time between an exit of a first tyre from the check path and an entrance of a second tyre into the check path is between about 25s and about 35s.

47. The method as in claim 34, wherein said overturning axis is perpendicular to said main rotation axis and belongs to said axial centreline plane.

* * * * *